United States Patent [19]

Ally

[11] Patent Number: 4,651,635
[45] Date of Patent: Mar. 24, 1987

[54] APPARATUS FOR MAKING PASTRIES

[76] Inventor: Sa-Aydien Ally, 10 Joan Street, New Clare, Johannesburg, South Africa

[21] Appl. No.: 642,955

[22] Filed: Aug. 21, 1984

[30] Foreign Application Priority Data

Aug. 22, 1983 [ZA] South Africa ............. 83/6174

[51] Int. Cl.$^4$ ............. A21C 11/00; B29C 61/10
[52] U.S. Cl. ............. 99/450.6; 99/450.7; 425/113; 425/297; 425/308; 425/324.1; 425/340
[58] Field of Search ............. 49/450.6, 450.7; 425/113, 296, 297, 308, 324.1, 334, 340, 383, 394, 403, 396, 397; 414/137, 468.4

[56] References Cited

U.S. PATENT DOCUMENTS

| 3,690,248 | 9/1972 | Schafer | 99/450.6 |
| 3,782,271 | 1/1974 | Tobey et al. | 99/450.6 |
| 3,865,963 | 2/1975 | Gugler | 426/502 |
| 3,912,433 | 10/1975 | Ma | 99/450.6 |
| 4,014,254 | 3/1977 | Ohkawa | 99/450.6 |
| 4,299,533 | 11/1981 | Ohnaka | 414/737 |
| 4,418,085 | 11/1983 | Becquelet | 99/450.7 |
| 4,439,124 | 3/1984 | Watanabe | 99/450.6 |
| 4,483,242 | 11/1984 | Goodman et al. | 99/450.6 |

Primary Examiner—Willard E. Hoag
Attorney, Agent, or Firm—Ladas & Parry

[57] ABSTRACT

The invention provides pastry machinery for forming a multi-layered pastry comprising a dough extruder which forms dough into sheet form, a pre-cooking station for the sheet of dough, a moisturizing station, a cutting station and means for transporting a cut leaf of dough onto a folding device. The folding device folds the pastry through a series of folds once a charge of filling has been deposited on the leaf of dough.

3 Claims, 9 Drawing Figures

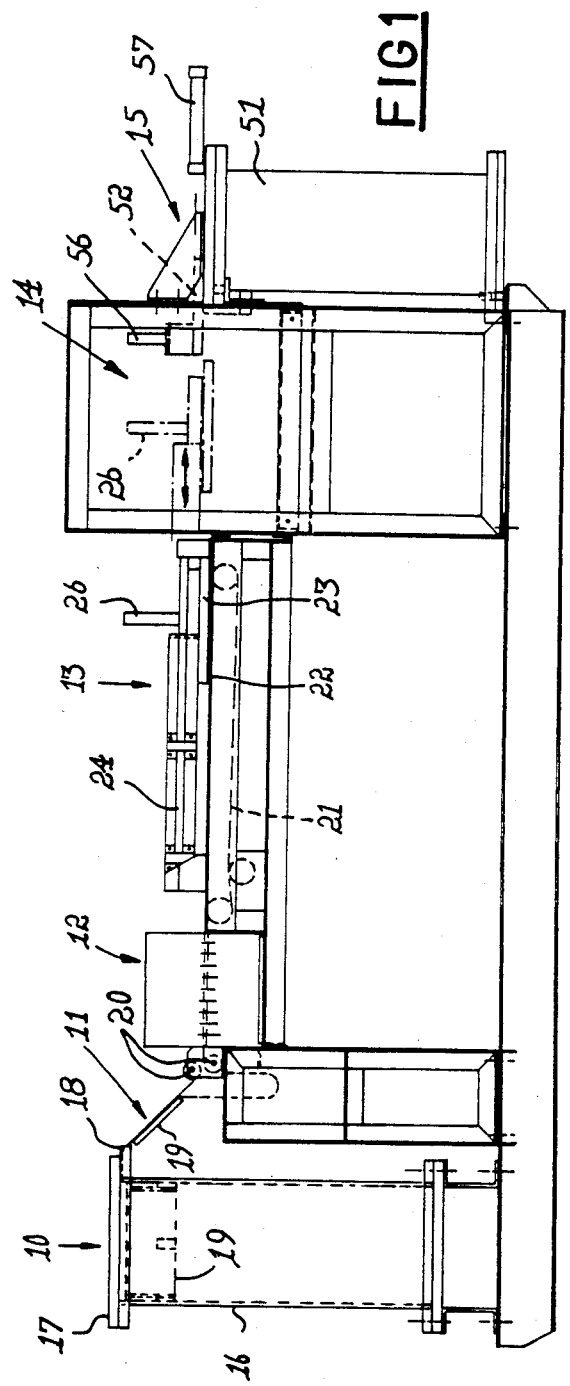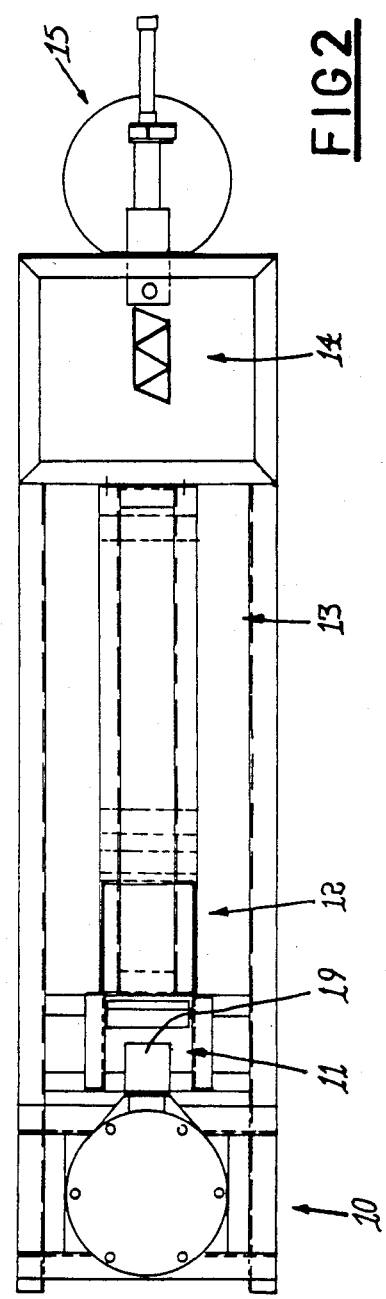

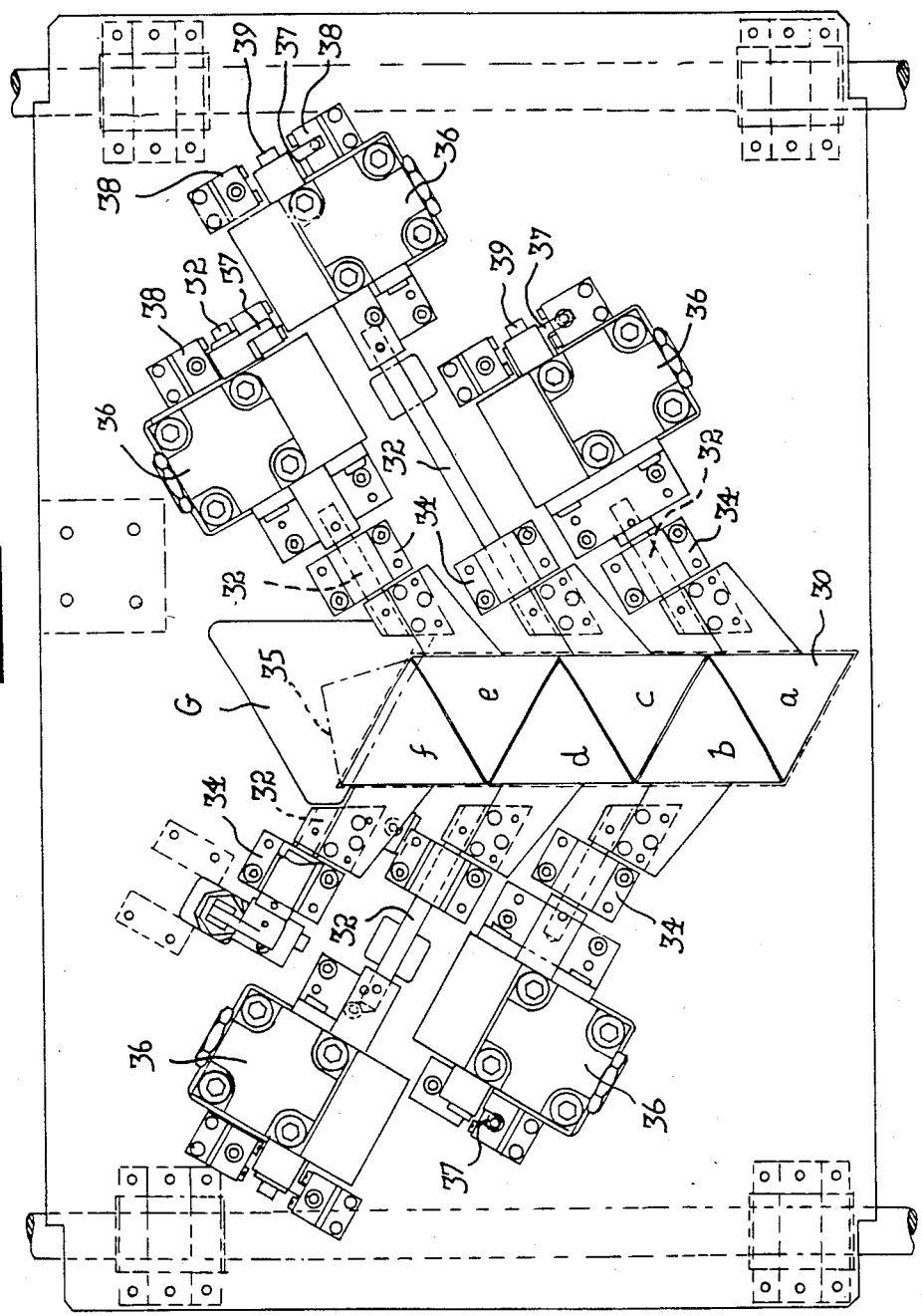

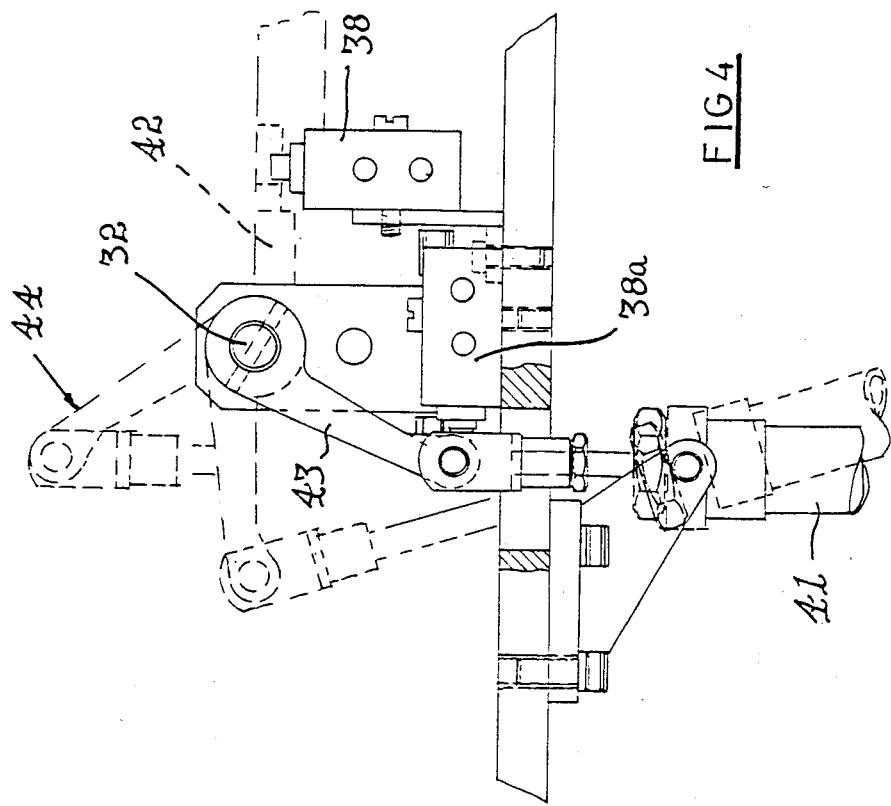

APPARATUS FOR MAKING PASTRIES

This invention relates to apparatus suitable for making multi-layered folded pastries.

Folded pastries such as those known locally as "samoosas" are made by hand because of the complex folding steps which are involved, and it is an object of the present invention to mechanize the folding process.

According to the invention a method of producing a multi-layered folded pastry comprises the steps of forming dough into a thin sheet; cutting a leaf of dough from the end of the formed sheet; depositing the leaf onto a folding table comprising a plurality of movable plate elements disposed adjacent one another; and folding the leaf of dough from one or both ends thereof through pivotal movement of the plate elements to form a multi-layered folded pastry.

In most instances it will be desirable to provide a charge of filling on the leaf of dough prior to the folding operation. Such a charge of filling will be deposited in a position spaced from the end of the leaf so that the first fold of dough encloses the charge and the second and subsequent folds carries the charge along the folding plate. It is envisaged that the charge of filling will be extruded from a reservoir in the form of a metered billet and transported to a position overlying the folding device. In the latter position the billet will be punched from its carrier for deposition on the leaf of dough.

Also according to the invention the method includes the step of pre-cooking the extruded sheet of dough by means of a heating element, and moistioning the sheet of dough in a mist spraying process, prior to the folding process.

Further according to the invention the method includes the step of cutting the sheet of dough into leaves of the required size, and lifting such a leaf for transportation to the folding mechanism. Preferably the leaf will be lifted by means of a lifting pad which acts on the leaf of dough through suction.

Also included within the scope of the invention is pastry machinery suitable for use in the method of the invention comprising a dough forming station where dough is formed into thin sheet form, a cutting station where the formed dough is cut into leaves of a required size, and a folding station wherein a leaf of dough is folded through a sequence of folds to provide a multi-layered pastry.

The folding station of the machinery may comprise a plurality of plate elements disposed adjacent one another to define a dough receiving plateform, each plate element being hingeably mounted for angular movement substantially about its line of junction with an adjacent element, and means for angularly moving each plate so as to fold dough resting thereon onto an adjacent element.

Preferably the hinged elements or segments are of equilateral triangular configuration with the apexes of adjacent plates facing in opposite transverse directions to form a substantially continuous dough receiving surface in the shape of a parallelagram, with the hinge axes of the triangles alternating between 60° and 120° angles relative to the longitudinal direction of the dough receiving surface. Such an arrangement will provide a triangular pastry, and where a different shape of pastry is required for example a rectangular pastry the segments can be varied accordingly. Thus with a rectangular pastry the hinge axes will be at right angles to the longitudinal direction of the dough receiving surface. In most instances the segments will be of shallow concave shape to give a corresponding shape to the folded pastry.

Operating means for the hinge elements of segments will comprise a shaft member coupled to a segment substantially co-axially with hinge axis thereof and drive means adapted to rotate the shaft through substantially 180° and thereafter reverse it through substantially 180° so that the shaft is returned to its original attitude. The last segment will rotate sufficiently to eject the pastry into a receiving zone such as a chute.

The machinery of the invention further includes a dough forming station comprising a dough extruder in the form of a cylinder and piston and an elongated extrusion orifice through which the dough is forced by means of a piston. On leaving the extruder the sheet of dough will preferably be pre-cooked on an angled heated plate element over which the sheet of dough moves under the influence of gravity. From the cooking plate the sheet of dough will move through a spray booth where it is moisturized by an airborne mist of water. From the moisturizing booth the sheet of dough will be conveyed by means of an endless belt conveyor or the like to a cutting and transporting station. A cutting and transporting station in accordance with the invention comprises a lifting pad having suction means adapted to cause a leaf of dough to adhere to the lifting pad for purposes of conveying the leaf to the folding station. Further according to this aspect of the invention the lifting pad is provided with a downwardly depending cutting blade which is adapted to descend on the sheet of dough to cut a leaf therefrom. A vertically mounted ram device may be provided for vertical movement of the lifting pad while a horizontally mounted ram device will move the lifting pad between the cutting station and folding station.

A further aspect of the invention comprises apparatus for depositing a charge of filling onto a leaf of dough at the folding station, comprising an extruder adapted to urge filling material into a billet forming aperture and conveying means adapted to transport the billeted filling into a position overlying the leaf of dough for deposition onto the leaf. The carrier will preferably be in the form of a slide which is movable between the position wherein the billet forming aperture communicates with the extruder and in a position wherein the aperture overlies the leaf of dough. Preferably an ejector will be provided to punch the charge of filling from the billet forming aperture onto the leaf of dough.

It is intended that the various stations and elements of the apparatus disclosed herein will all be included separately within the scope of the invention.

In order more clearly to illustrate the invention an embodiment thereof is described hereunder purely by way of example with reference to the accompanying drawings wherein:

FIG. 1 is an elavation in schematic form of a pastry making assembly showing a dough extruding station, a pre-cooking station, a moisturizing station, a cutting station, a folding station and a pastry filling station;

FIG. 2 is a plan in schematic form of the arrangement in FIG. 1;

FIG. 3 is a plan of a folding station;

FIG. 4 is an elevation of an operating mechanism for use in the folding station in FIG. 3;

Figure 5:
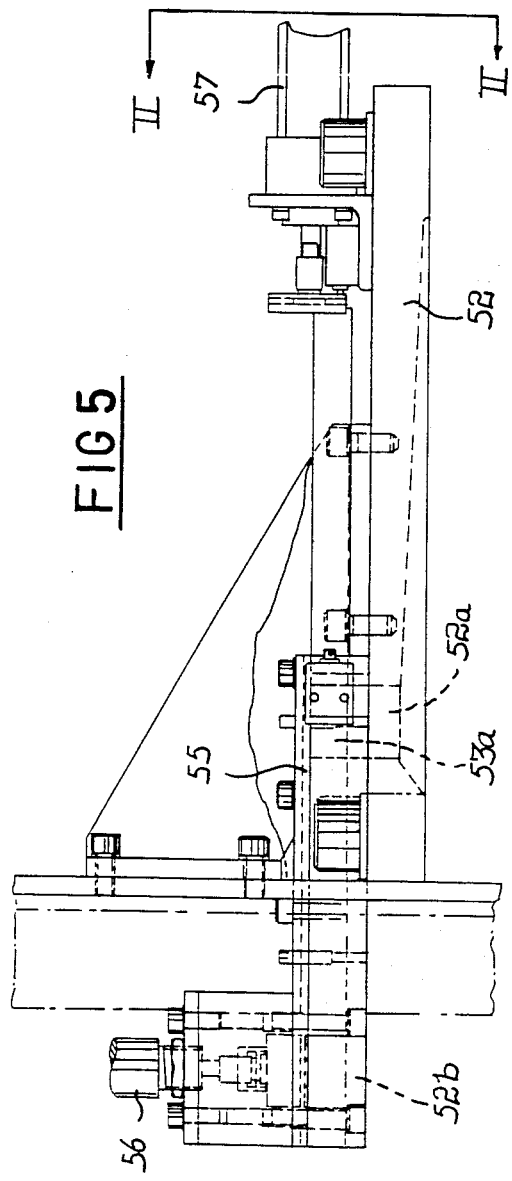
FIG. 5 is an elevation of portion of a pastry filling station.

Referring to the drawings an assembly for making multi-layered folded pastries, such as samoosas comprises a dough extruding station 10 which is adapted to extrude a thin sheet of dough; a pre-cooking sttion 11 which partially cooks dough extruded from the station 10, a moisturizing station 12 from which the sheet of dough passes to a cutting and transfer station 13 which lifts a leaf of the dough onto a folding station 14. The latter folds the dough through a predetermined number of folding operations after a charge of filling had been deposited onto the dough by a filling station 15. The various stations are described in more detail below.

The dough extruder 10 comprises a cylinder 16 which houses a piston member 19 which is movable upwardly to force dough through an elongated slot at 18. A lid 17 for the cylinder 16 is removable to permit the extruder to be charged with dough. If necessary one or more pairs of rollers [not shown] can be provided at the exit 18 for purposes of smoothing and gauging the dough to a required thickness. For a multi-layered pastry a basic thickness in the order of 0.5 mm may be required and the nip defined between two rollers will be set to roll the dough to this thickness.

On passing from the dough extruder 10 the dough moves down a heated plate element 19 provided at the pre-cooking station 11. It is envisaged that the plate element 19 will be sufficiently long to give the required cooking treatment to the dough and the length of the plate will of course depend on the speed at which the dough moves over the plate, and the temperature thereof.

From the pre-cooking station 11 the length of dough passes between feed rollers 20 and through a moisturizing station 12. It is envisaged that the spray nozzles within the station 12 will provide a water mist which will act to moisten the dough to render the dough sufficiently pliable to fold.

Figure 8:
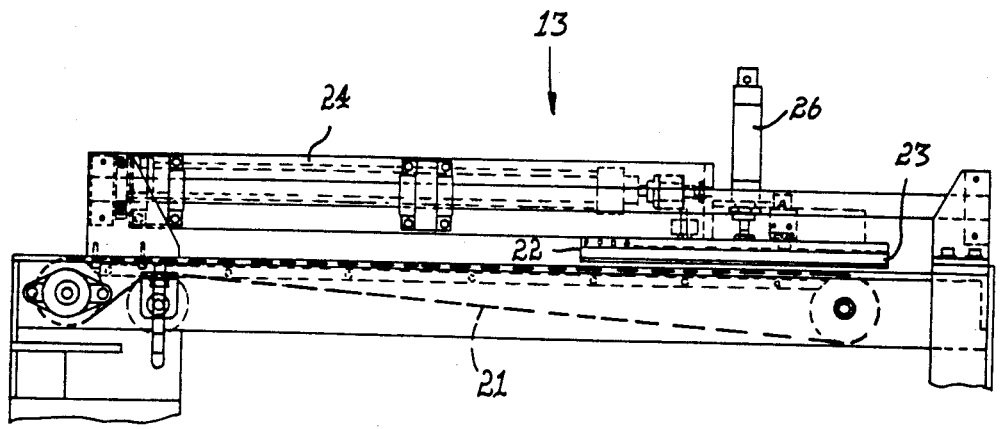
FIG. 8 is an elevation of a cutting station.
Figure 9:
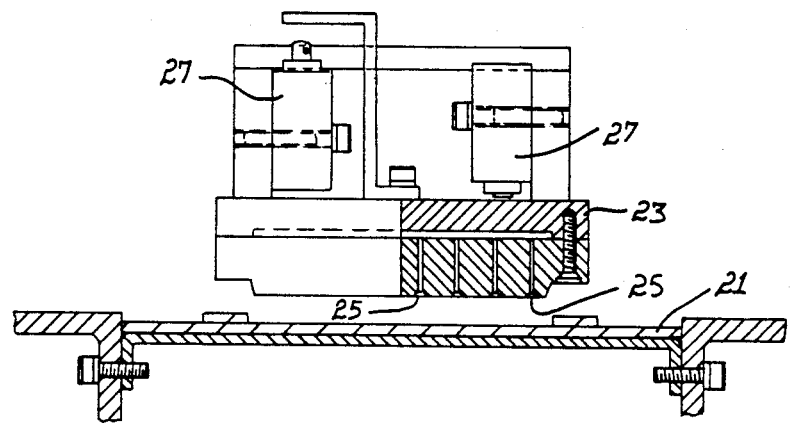
FIG. 9 is an end elevation of the cutting station of FIG. 8.

From the mositurizing station 12 the length of dough is led onto an endless belt conveyor 21 for conveyance towards the cutting and transfer station 13. The latter station will be activated by a suitble sensor which is adapted to detect the arrival of the leading end of the strip of dough. With reference to FIGS. 8 and 9 the station 13 comprises a vertically movable lifting platform 23 which includes a downwardly depending transverse blade element 22 which is adapted to cut through the dough strip upon downward movement of the lifting pad 23. Vertical movement of the lifting pad is controlled by means of a ram 26 and sensors 27, FIG. 9. If desirable longitudinal downwardly depending cutting blades can also be provided on the lifting pad to trim the longitudinal edges of the strip of dough below the lifting pad 23. Alternatively the edges could be trimmed as they pass through the feed rollers 20. In some instances no trimming of the longitudinal edges of the dough strip may be necessary. The lifting pad 23 includes a plurality of suction apertures 25 FIG. 9 therein coupled to an evacuator (not shown). The suction effect of the lifting pad when it is lowered into contact therewith by means of the ram 26 will cause the cut leaf of dough to cling to the bottom of the pad for conveyance to the dough folding station 14. For this purpose the lifting pad is coupled to a transporter unit 24 in the form of a horizontally mounted ram. On extension of the ram 24 the lifting pad will move to the position shown in broken lines at station 14. In this position the lifting pad may be lowered to a suitable position by means of the ram 26 and suction applied to the lifting pad will be temporarily interrupted causing the leaf dough to drop onto the folding assembly which will be described in more detail below.

With reference to FIG. 3 the folding device comprises a plurality of plate elements 30 of equilateral triangular configuration which are disposed one adjacent the other to form an elongated dough receiving platform. A leaf of dough will overlie the platform 30 in the position shown by the broken line 65. Each elements 30 is capable of moving along the line of abutment with its adjacent elements so that in use a triangular segment of dough is folded onto the adjacent element progressively from the segment a to the segment f and ultimately ejected by the segment f down a shute 40. The latter extends forwardly from the plane of the platform 30. In the arrangement illustrated each triangular segment 30 is secured to a co-planar shaft. Each shaft 32 is rotatably mounted by means of suitable bearing arrangements 34 as illustrated.

In the arrangement in FIG. 3 the shafts 32 of the segments a to e are coupled to rotary reversable pneumatic drive motors 36 which are activated progressively to rotate the shafts 32 through 180° and thereafter reverse the movement through 180° to the starting position. For purposes of reversing the drive motors 36 a pair of control valves 38 and 38a will be arranged on each side of the remote end of the motor drive shaft 39, in diametically opposed relationship. A lever arm 37 mounted on the motor drive shaft 39 will be in contact with a first control valve 38 upon activation of the motor. Once the lever 37 is moved through 180° it contacts the second control valve 38a causing a reversal of the drive direction until the lever 37 is again in contact with the first control valve 38.

The drive means for the segment f in FIG. 3 differs from the rotary drive means for the segments a to e in that a less costly ram device is employed since the segment f is required only to flip the folded pastry down the chute 40 and need not move through no more than 90°. The ram device 41 is designed to act on a lever arm 43 coupled to the shaft 32 of the segment. Control valves 38 are conveniently arranged as illustrated in FIG. 4. The lever arm 43 is movable from a first position shown in broken lines at 44 wherein a finger element 46 to the shaft 32 is in contact with one of the control valves 38, to a second position wherein the segment f will be moved through approximately 150° and wherein the second control valve 38 is contacted as shown in the drawing. The second position of the segment f is shown in broken lines at 35 in FIG. 3. It will be understood that as the lever arm 43 moves to the second extreme position the segment f will eject the folded pastry down the chute 44o.

In the arrangement illustrated the folding device is designed to fold a pastry of equilateral triangular configuration, and accordingly the plate elements 30 are hinged for movement about axes which lie alternately at substantially 60° and 120° to the longitudinal axis of the device. In this way the folding action of an element will deposit a corner of dough which corresponds to the shape of the succeeding folding element, onto such succeeding element. Preferably the segments are of shallow concave shape so that a corresponding shape is given to the folded pastry and the internal filling can be accommodated within such pastry. It will be appreciated that where a pastry is to be of rectangular configuration the hinged axes of the plate elements 30 will be disposed at right angles to the longitudinal axis of the device. Other variations are of course possible.

Figure 6:
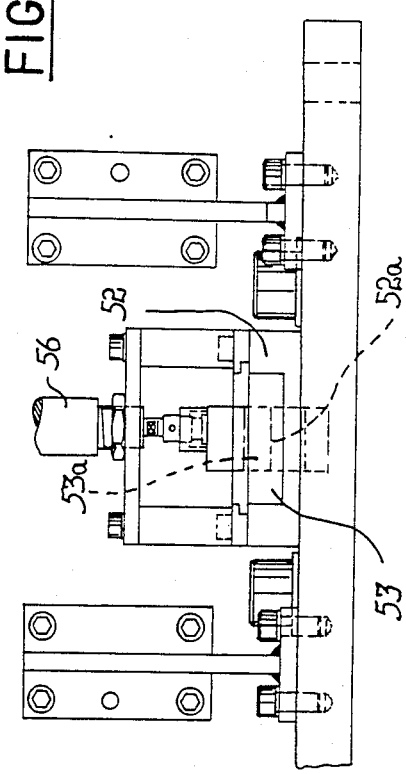
FIG. 6 is an end elevation of the filling station in FIG. 5.
Figure 7:
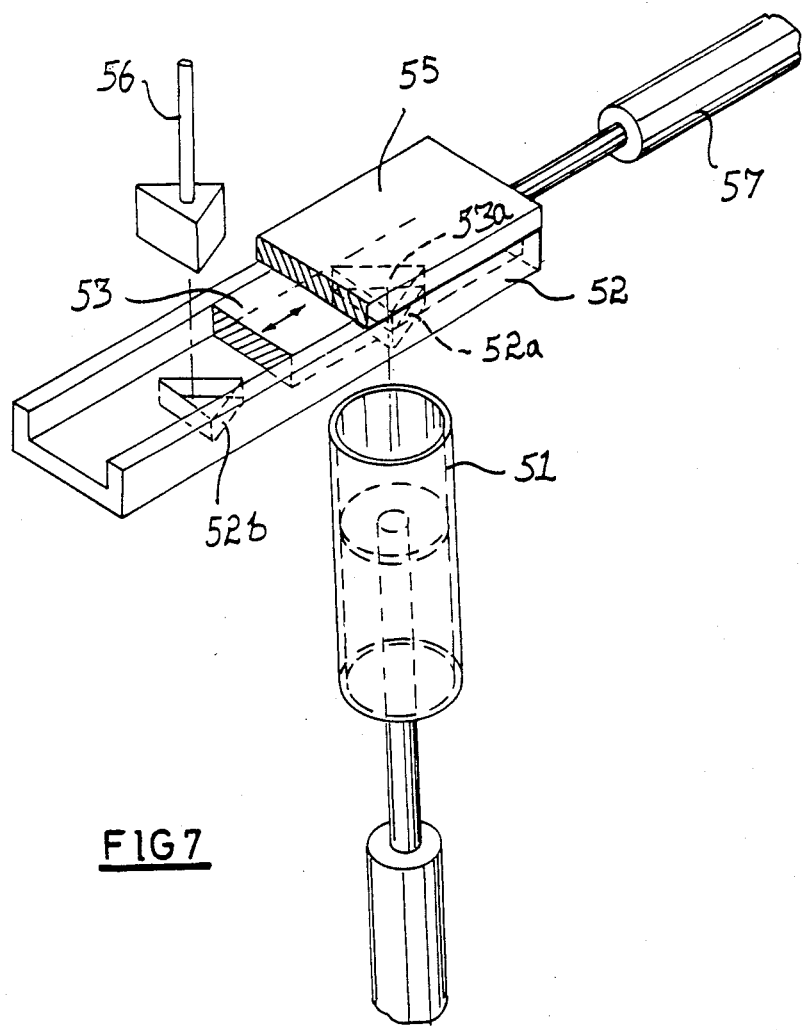
FIG. 7 is a schematic perspective view illustrating the operation of the filling station of FIG. 5.

With reference to FIGS. 6 to 8 the filling station comprises an extruder in the form of a cylinder 51, FIG. 1, which houses a piston (not shown) which is adapted to urge filling material through an aperture in an upper closure plate 52. A billet metering and transporting slide 53 is slidably movable on the plate 52 and defines a metering aperture 53a in which a billet is formed. The slide 53 is guided during movement thereof between side walls of the plate 52 as shown in FIG. 8. An upper guide plate 55 serves to trap the slide 53 in position. With reference to FIG. 1 it will be noted that the plate 52 extends from the cylinder 51 to a position overlying the folding station 14 and a second aperture 52b, FIG. 8 will be provided in the plate 52 to align with the folding segment b of the folding device 30. The upper guide plate will be provided with a corresponding aperture therethrough to permit an ejector 56 to pass through the assembly. A ram device 57 will act to move the slide 53 between one extreme position wherein its metering aperture 53a aligns with the aperture 52a in the closure plate 52 and in this position filling material will be forced into the metering aperture 53a from the cylinder 51.

From the first position the slide 53 will be moved by means of a ram 57 to a second position wherein the metering aperture 53a now carrying a billet of filling, aligns with the aperture 52b and with the folding device 30. Once a leaf of dough has been deposited on the folding device 30 the ejector 56 will move downwardly and eject the billet onto the dough. It will be appreciated that variations are possible with regard to the filler mechanismn and in some instances it may be desirable to move the plate member 52 so that the aperture 52b aligns with the appropriate leaf element of the folding device 30.

It is believed that the assembly of the invention will produce multi-layered folded pastries efficiently and cheaply and the advantages will be apparent to persons skilled in the art.

I claim:

1. Pastry machinery suitable for producing a folded pastry comprising a means for forming dough into thin sheets, a means for cutting dough into leaves of a required size, and a folding means wherein a leaf of dough is folded through a sequence of folds to provide a multi-layered pastry; the folding means comprising at least 3 plate elements disposed adjacent one another to define a dough receiving platform, each plate element being hingeable mounted for angular movement substantially about the line of junction with an adjacent element, and means for angularly moving each plate element so as to fold dough resting thereon onto an adjacent element.

2. Pastry machinery according to claim 1 wherein the elements are of equilateral triangular configuration with the apexes of adjacent plates facing in opposite transverse directions to form a substantially continuous dough receiving surface in the shape of a parallelagram, with a hinge axes of triangles alternating between 60° and 120° angles relative to the longitudinal direction of the dough receiving surface.

3. Pastry machinery suitable for producing a folded pastry comprising a means for forming dough into thin sheets a means for cutting dough into leaves of a required size, and a folding means comprising at least 3 elements for leaves of dough wherein a leaf of dough is folded through a sequence of folds to provide a multi-layered pastry; further comprising a pre-cooking device for a sheet of dough comprising a heated plate which is angled to permit the sheet of dough to move over the plate under the influence of gravity.

* * * * *